(12) United States Patent
Yoshimoto et al.

(10) Patent No.: US 7,920,446 B2
(45) Date of Patent: *Apr. 5, 2011

(54) OPTIMIZING FOCUS POINT FOR OPTICAL DISC

(75) Inventors: Ainobu Yoshimoto, Milpitas, CA (US); Hung Phi Dang, Santa Clara, CA (US)

(73) Assignee: LSI Corporation, Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/632,046

(22) Filed: Dec. 7, 2009

(65) Prior Publication Data

US 2010/0080093 A1    Apr. 1, 2010

Related U.S. Application Data

(63) Continuation of application No. 11/450,846, filed on Jun. 9, 2006, now Pat. No. 7,633,840.

(51) Int. Cl.
*G11B 7/00* (2006.01)

(52) U.S. Cl. .................................... 369/44.29

(58) Field of Classification Search .................. None
See application file for complete search history.

(56) References Cited

U.S. PATENT DOCUMENTS

| 5,258,966 | A | 11/1993 | Yanagi | 369/30.17 |
| 5,663,942 | A | 9/1997 | Ishibashi et al. | 369/53.34 |
| 6,181,657 | B1 | 1/2001 | Kuroda et al. | 369/59.1 |
| 2003/0063534 | A1 | 4/2003 | Takeda | 369/47.22 |
| 2004/0145978 | A1 | 7/2004 | Yamamoto | 369/44.32 |
| 2005/0180276 | A1 | 8/2005 | Watanabe et al. | 369/44.29 |
| 2006/0203631 | A1 | 9/2006 | Wu et al. | 369/44.26 |

*Primary Examiner* — Peter Vincent Agustin

(74) *Attorney, Agent, or Firm* — Christopher P. Maiorana, PC

(57) ABSTRACT

An apparatus includes a first circuit and a second circuit. The first circuit may be configured to generate status signals and an error signal in response to accessing a storage medium. The error signal provides a first value based on an accuracy of accessing the storage medium. The second circuit may be configured to offset the first value of the error signal to a second value to increase the accuracy of accessing said storage medium. The status signals include one or more of a data signal and a differential signal. In a first mode, an offset signal is generated in response to the data signal. In a second mode, the offset signal is generated in response to the differential signal.

20 Claims, 9 Drawing Sheets

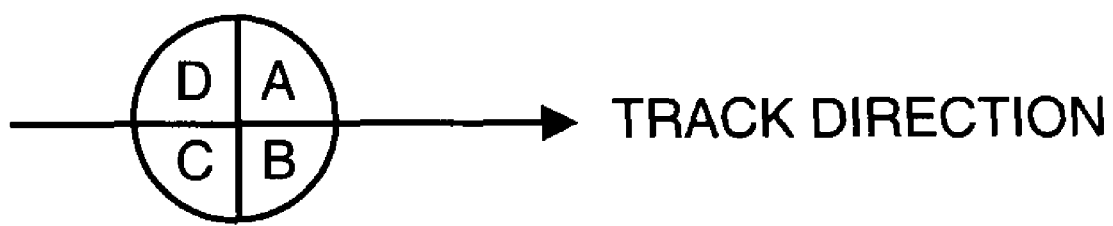
FIG. 1
(CONVENTIONAL)

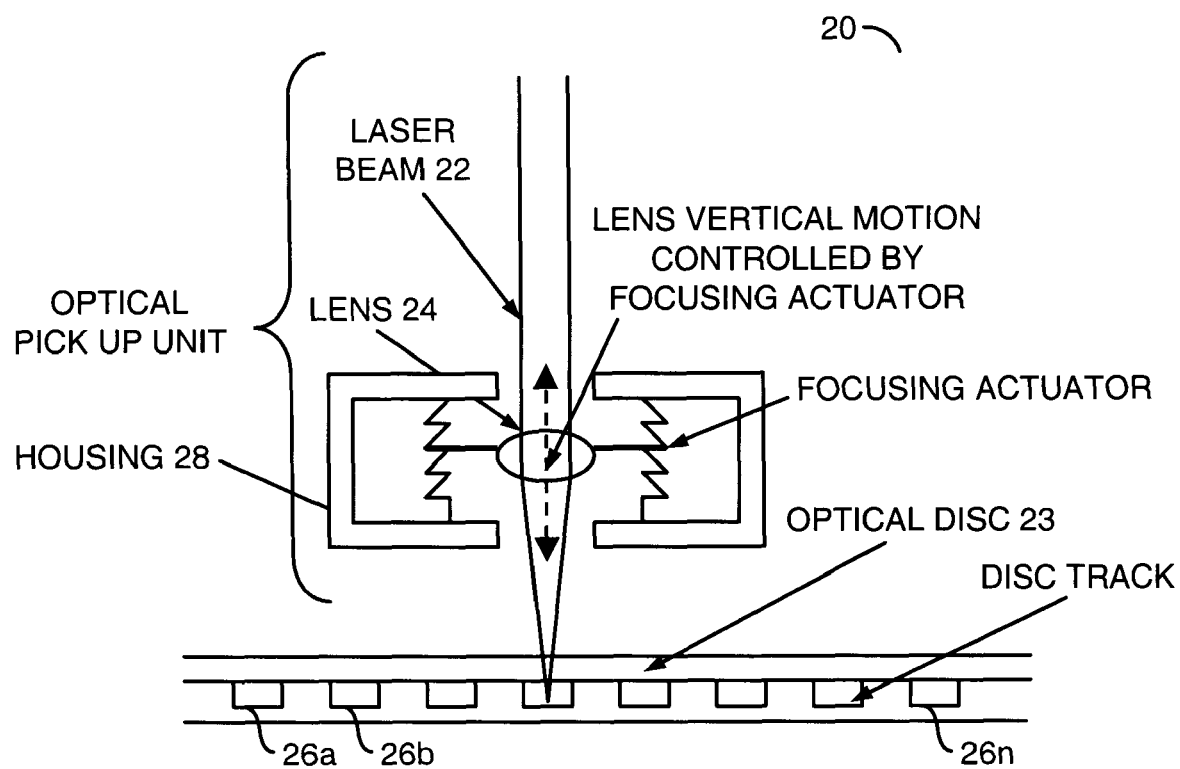
FIG. 2
(CONVENTIONAL)

OPTIMIZING FOCUS POINT FOR OPTICAL DISC

This is a continuation of U.S. Ser. No. 11/450,846, filed Jun. 9, 2006, now U.S. Pat. No. 7,633,840, which is incorporated by reference.

FIELD OF THE INVENTION

The present invention relates to optical storage generally and, more particularly, to a method and/or apparatus for optimizing a focus point for optical disc.

BACKGROUND OF THE INVENTION

In a conventional optical disc system, to sense the position of the laser beam in relation to the track on the disc, a main laser beam creates a reflection from the disc. The reflection from the main laser beam is picked up by 4 photo-diode sensors within a photo-diode sensor assembly. FIG. 1 is a conceptual diagram illustrating how such a photo-diode sensor assembly 10 is laid out in relation to the track direction. The outputs of the 4 photo-diodes within the photo-diode assembly 10 (when the laser beam is focused on the disc) are shown as signals A, B, C and D, respectively.

Referring to FIG. 2, a conventional optical disc system 20 is shown. A focus actuator (not shown) will keep a laser beam 22 focused on a surface of the disc 23 by adjusting the vertical position of a lens 24. A focus controller (not shown) controls the focus actuator. To control the focus actuator to keep the laser beam 22 focused on the surface of the disc 23, a signal focus error (FE) is controlled to zero and a signal beam strength (BS) is controlled to a high value. The signal FE provides information related to the vertical position of the lens 24. The signal BS provides information related to the strength of the laser beam 22. Due to the alignment of the photo-diode sensor 10 when the signal FE is controlled to zero, the focus point of the laser beam 22 may not be optimally positioned on the surface of the disc 23. It is necessary to adjust the signal FE slightly off of a zero level in order to optimally establish the focus point of the laser beam 22 on the surface of the disc 23. Conventional methods fail to provide an optimal focus point of the laser beam on the surface of the disc when the signal FE is slightly off a zero level (or at an optimized focus offset level). Since conventional methods fail to provide an optimal focus point of the laser beam on the disc, the overall quality of reading and writing data from and to the disc will be decreased.

It would be desirable to provide a method and/or apparatus to optimize the focus point for an optical disc.

SUMMARY OF THE INVENTION

The present invention concerns an apparatus including a first circuit and a second circuit. The first circuit may be configured to generate status signals and an error signal in response to accessing a storage medium. The error signal provides a first value based on an accuracy of accessing the storage medium. The second circuit may be configured to offset the first value of the error signal to a second value to increase the accuracy of accessing said storage medium. The status signals include one or more of a data signal and a differential signal. In a first mode, an offset signal is generated in response to the data signal. In a second mode, the offset signal is generated in response to the differential signal.

The objects, features and advantages of the present invention include providing a method and/or apparatus for optimizing the focus point for an optical disc that may (i) provide for a reliable method of optimizing the focus point of a laser beam, (ii) optimize the focus point of a laser beam to read and write data on an optical disc, (iii) increase quality in the read/write process, (iv) be inexpensive to implement and/or (v) be easy to implement.

BRIEF DESCRIPTION OF THE DRAWINGS

These and other objects, features and advantages of the present invention will be apparent from the following detailed description and the appended claims and drawings in which:

FIG. 1 illustrates a photo-diode sensor distribution;

FIG. 2 illustrates a lens and a lens housing in relation to a position of a laser beam;

DETAILED DESCRIPTION OF THE PREFERRED EMBODIMENTS

Figure 3:
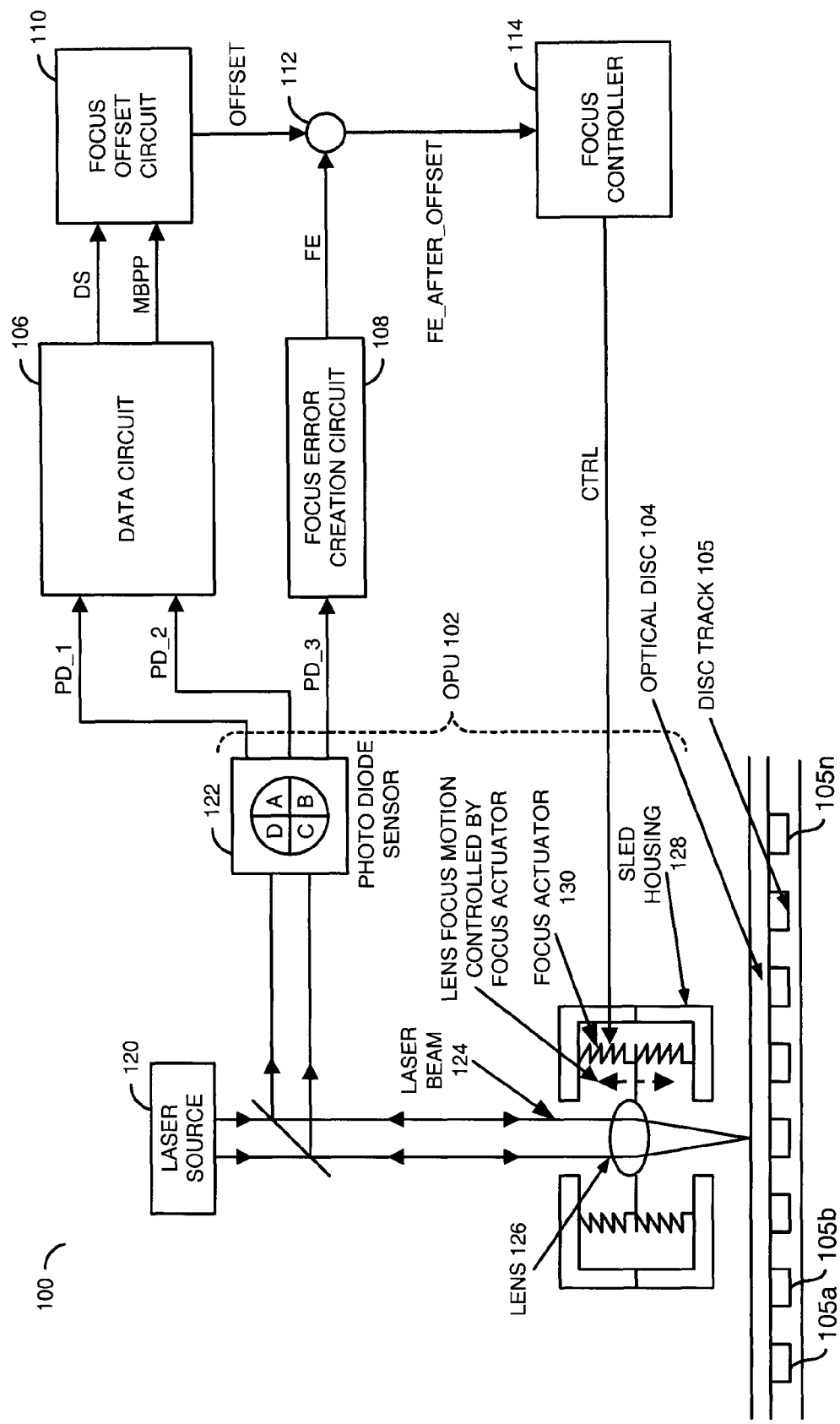
FIG. 3 is a diagram of a system incorporating the present invention.

Referring to FIG. 3, a block diagram of a system 100 is shown in accordance with a preferred embodiment of the present invention. The system 100 generally comprises an optical pick-up unit (OPU) 102, an optical disc 104, a number of disc tracks 105a-105n, a block (or circuit) 106, a block (or circuit) 108, a block (or circuit) 110, a block (or circuit) 112, a block (or circuit) 114 and a laser source 120. The circuit 106 may be implemented as data circuit. The circuit 108 may be implemented as a focus error creation circuit. The circuit 110 may be implemented as a focus offset circuit. The circuit 112 may be implemented as an adder circuit. The circuit 114 may be implemented as a focus controller. The circuits 110, 112 and 114 may be implemented via hardware or software. In one example, the circuits 110, 112 and 114 may be implemented as hardware circuits. Depending on the particular hardware design, the circuits 110, 112 and 114 may be analog and/or digital circuits. In one example, the circuits 110, 112 and 114 may each be implemented as a software block (e.g., a digital signal processing software structure) without the use of a hardware circuit. The implementation of the circuits 110, 112 and 114 as software or hardware may be varied to meet the design criteria of a particular implementation. The OPU 102 generally comprises a photo-diode sensor 122, a lens 126, a sled housing 128 and a focus actuator 130.

The photo-diode sensor 122 may present any combination of signals A, B, C and D on a signal (e.g., PD_1) to the data circuit 106. The photo-diode sensor 122 may present any combination of signals A, B, C, and D on a signal (e.g., PD_2) to the data circuit 106. The photo-diode sensor 122 may present any combination of signals A, B, C and D on a signal (e.g., PD_3) to the focus error creation circuit 108. The data circuit 106 may present a data signal (e.g., DS) to the focus offset circuit 110. The data circuit 106 may present a signal (e.g., MBPP) to the focus offset circuit 110. The focus offset circuit 110 may present a signal (e.g., OFFSET) to the adder 112. The focus error creation circuit 108 may present the signal FE to the adder circuit 112. The adder circuit 112 may present a signal (e.g., FE_AFTER_OFFSET) to the focus controller 114. The focus controller 114 may control the vertical position of the lens 126 with a signal (e.g., CTRL).

In a first state, the data circuit 106 may present the signal DS to the focus offset circuit 110 when reading data from the disc 104. The focus offset circuit 110 may generate the signal OFFSET in response to the signal DS. In a second state, the data circuit 106 may present the signal MBPP to the focus offset circuit 110 when writing or rewriting (recording) data to the disc 104. The focus offset circuit 110 may generate the signal OFFSET in response to the signal MBPP. The signal FE may be at zero (or at a first value) when the focus controller 114 keeps the laser beam 124 focused on the surface of the disc 104. The focus offset circuit 110 may offset the signal FE to a level off of zero (or to a second value) to ensure that the focus point of the laser beam 124 is at an optimal position. The focus offset circuit 110 may adjust (or increase) the focus point of the laser beam 124 when (i) reading data from any one of a particular tracks 105a-105n and (ii) writing data to any one of a particular tracks 105a-105n.

Figure 4:
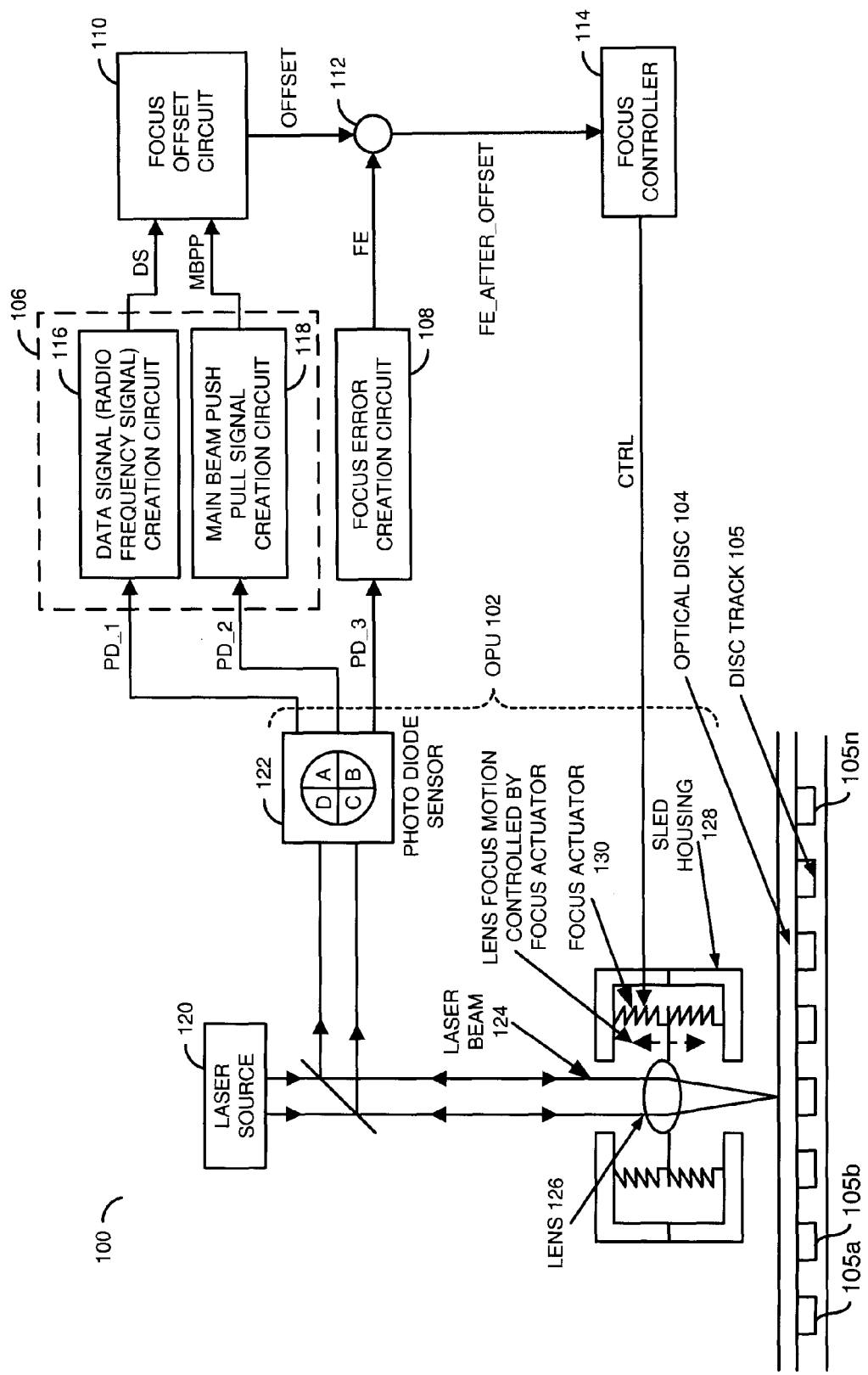
FIG. 4 is a more detailed diagram of the data circuit in the context of the present invention.

Referring to FIG. 4, a more detailed diagram of the data circuit 106 in the context of the present invention is shown. The data circuit 106 generally comprises a block (or circuit) 116 and a block (or circuit) 118. The circuit 116 may be implemented as a data signal creation circuit. The circuit 118 may be implemented as a push-pull signal creation circuit. The focus offset circuit 110 may generate the signal OFFSET when (i) data is read from any one of a particular tracks 105a-105n and (ii) data is written to any one of a particular tracks 105a-105n.

In the first state, when reading data from the disc 104, the data signal creation circuit 116 may generate the signal DS. The signal DS may be a radio frequency signal. The signal DS may be generated from data on the optical disc 104. The focus offset circuit 110 may generate the signal OFFSET based on the value of the signal DS. The signal FE may be zero when the focus actuator 130 adjusts the focus point of the laser beam 124 on the surface of the disc 104 (e.g., the focus actuator 130 adjusts the vertical position of the lens 126 with respect to the laser beam 124). The focus actuator 130 may be positioned within the sled housing 128. The focus actuator 130 may be implemented as a voice coil motor. The focus actuator 130 may act as a spring and move the lens 126 vertically. The focus actuator 130 may adjust the vertical position of the lens 126 by controlling the amount of current that flows through a coil when in the presence of a magnetic field. The focus actuator 130 may be integrated as a hardware device within the OPU 102.

The adder circuit 112 may add the signal OFFSET to the signal FE to generate the signal FE_AFTER_OFFSET. In general, the system 100 may not obtain an optimal focus point of the laser beam 124 when the signal FE is equal to zero. The focus controller 114 may control the focus actuator 130 such that the signal FE_AFTER_OFFSET is always at zero. When the signal FE_AFTER_OFFSET is zero, an optimal focus point of the laser beam 124 may be achieved. If the signal OFFSET is zero, such a condition may illustrate that the signal FE is at zero (e.g., the signal FE_AFTER_OFFSET may be set to zero) and an optimal focus point of the laser beam 124 has been achieved. If the signal OFFSET is not zero, the focus actuator 130 (via control of the focus controller 114) may adjust the vertical position of the lens 124 such that the focus error creation circuit 108 may generate the signal FE to be at a reverse level (or value) of the signal OFFSET. The sum of the signal OFFSET and the signal FE (which is at a reverse level of the signal OFFSET) may ensure that the signal FE_AFTER_OFFSET is set to zero. In general, the signal OFFSET may control the focus actuator 130 to adjust the focus point of the laser beam 124 in order to achieve the optimal focus point. While in the first state, the laser beam 124 may be (i) focused on the surface of the disc 104 and (ii) controlled (by a tracking actuator (not shown)) to stay on any one of a particular tracks 105a-105n.

In the second state, when the disc 104 is recordable (e.g., data is written to the disc 104), the beam push-pull signal creation circuit 118 may generate the signal MBPP. The signal MBPP may be a low frequency signal. The focus offset circuit 110 may generate the signal OFFSET based on the value of the signal MBPP. The signal FE may be zero when the focus actuator 132 adjusts the focus of the laser beam 124 on the surface of the disc 104. The adder circuit 112 may add the signal OFFSET to the signal FE to generate the signal FE_AFTER_OFFSET. In general, the system 100 may not obtain an optimal focus point of the laser beam 124 when the signal FE is equal to zero. The focus controller 114 may control the focus actuator 130 such that the signal FE_AFTER_OFFSET is always at zero. When the signal FE_AFTER_OFFSET is zero, an optimal focus point of the laser beam 124 may be achieved. If the signal OFFSET is zero, such a condition may illustrate that the signal FE is at zero (e.g., the signal FE_AFTER_OFFSET may be set to zero) and an optimal focus point of the laser beam 124 has been achieved. If the signal OFFSET is not zero, the focus actuator 130 (via the control of the focus controller 114) may adjust the vertical position of the lens 124 such that the focus error creation circuit 108 may generate the signal FE to be at a reverse level of the signal OFFSET. The sum of the signal OFFSET and the signal FE (which is at a reverse level of the signal OFFSET) may ensure that the signal FE_AFTER_OFFSET is set to zero. While in the second state, the laser beam 124 may be focused on the surface of the disc 104. The laser beam 124 may not be controlled to stay on any one of a particular tracks 105a-105n.

Figure 5:
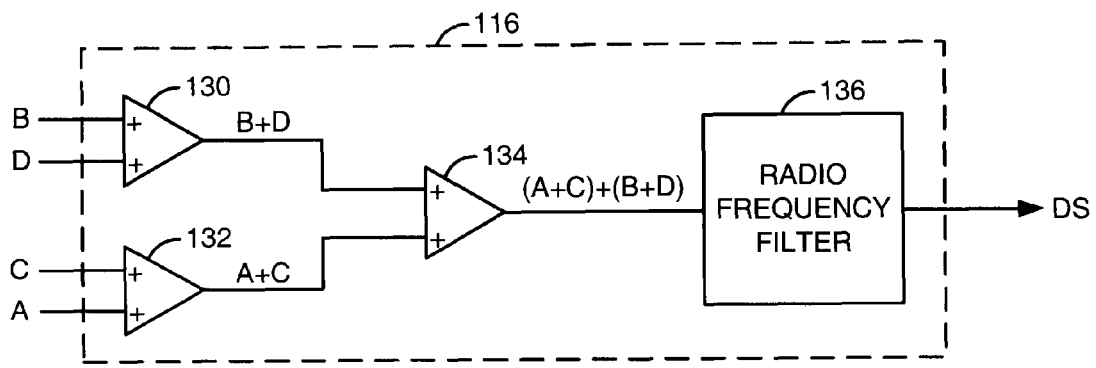
FIG. 5 is a diagram illustrating a data signal creation circuit.

Referring to FIG. 5, a more detailed diagram of the data signal creation circuit 116 is shown. The data signal creation circuit 116 generally comprises a circuit 130, a circuit 132, a circuit 134, and a circuit 136. The circuit 130, the circuit 132 and the circuit 136 may be implemented as summing circuits. The circuit 136 may be implemented as a radio frequency filter. The circuit 130 may (i) receive the signal B and the signal D and (ii) present a signal equal to B+D. Similarly, the circuit 132 may (i) receive the signal A and the signal C and (ii) present an output signal equal to A+C. The summing circuit 134 may (i) receive the signal A+C and the signal B+D and (ii) present a signal equal to (A+C)+(B+D). The signal (A+C)+(B+D) may be presented to the radio frequency filter 136. The radio frequency filter 136 may generate the signal DS. The signal DS or (radio frequency signal) may be a high frequency signal. The radio frequency filter 136 may be implemented as a high pass filter that is combined with one or more low pass filters. The data signal creation circuit 116 may generate the signal DS from data on the optical disc 104 as the laser beam 124 is focused on the surface of the disc 104 while the disc 104 is spinning.

Figure 6:
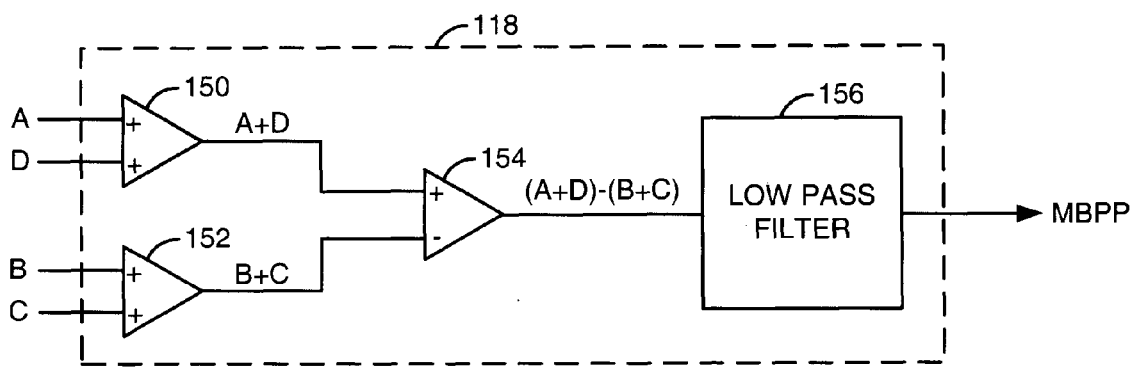
FIG. 6 is a diagram illustrating a main beam push-pull signal creation circuit.

Referring to FIG. 6, a more detailed diagram of the beam push pull creation circuit 118 is shown. The beam push pull creation circuit 118 generally comprises a circuit 150, a circuit 152, a circuit 154, and a circuit 156. The circuit 150 and the circuit 152 may be implemented as summing circuits. The circuit 154 may be implemented as a differential circuit (e.g., a comparator, etc.). The circuit 156 may be implemented as a low pass filter. The circuit 150 may (i) receive the signal A and the signal D from the photo-diode sensor 122 and (ii) present a signal equal to A+D. Similarly, the circuit 152 may (i) receive the signal B and the signal C from the photo-diode sensor 122 and (ii) present an output signal equal to B+C. The differential circuit 154 may (i) receive the signal A+D and the signal B+C and (ii) present a signal equal to (A+D)−(B+D). The signal (A+D)−(B+C) may be presented to the low pass filter 156, which may generate the signal MBPP. The signal MBPP may be a low frequency signal. The signal MBPP may be generated when (i) the laser beam 124 is focused on the surface of the disc 104 and (ii) the disc 104 is spinning. The disc 104 may (i) be independent of data (e.g., a blank disc) or (ii) include data (e.g., a rewrittable disc). Due to differences between the read and write processes, the optimal focus point of the laser beam 124 may be different.

Figure 7:
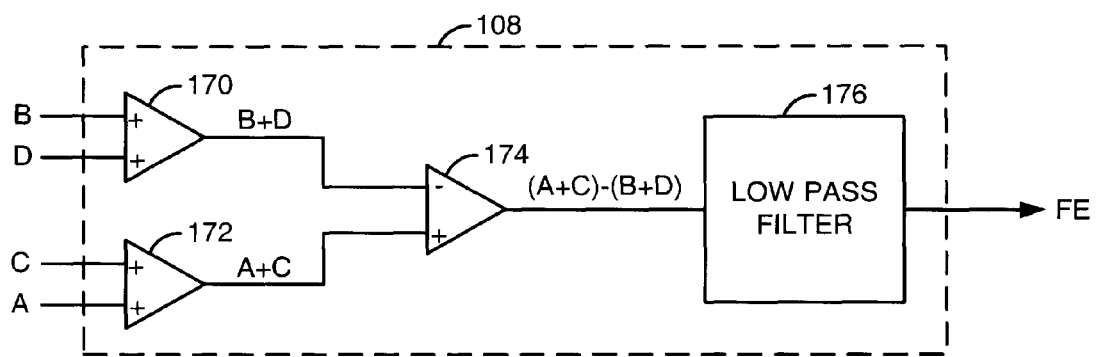
FIG. 7 is a diagram illustrating a focus error signal creation circuit.

Referring to FIG. 7, a more detailed diagram of the focus error creation circuit 108 is shown. The focus error creation circuit 108 generally comprises a circuit 170, a circuit 172, a circuit 174 and a circuit 176. The circuit 170 and the circuit 172 may be implemented as summing circuits. The circuit 174 may be implemented as a differential circuit (e.g., a comparator, etc.). The circuit 176 may be implemented as a low pass filter. The circuit 170 may (i) receive the signal B and the signal D and (ii) present a signal equal to B+D. Similarly, the circuit 172 may (i) receive the signal A and the signal C and (ii) present an output signal equal to A+C. The differential circuit 174 may (i) receive the signal A+C and the signal B+D and (ii) present a signal equal to (A+C)−(B+D). The signal (A+C)−(B+D) may be presented to the low pass filter 176, which generates the signal FE.

Figure 8:
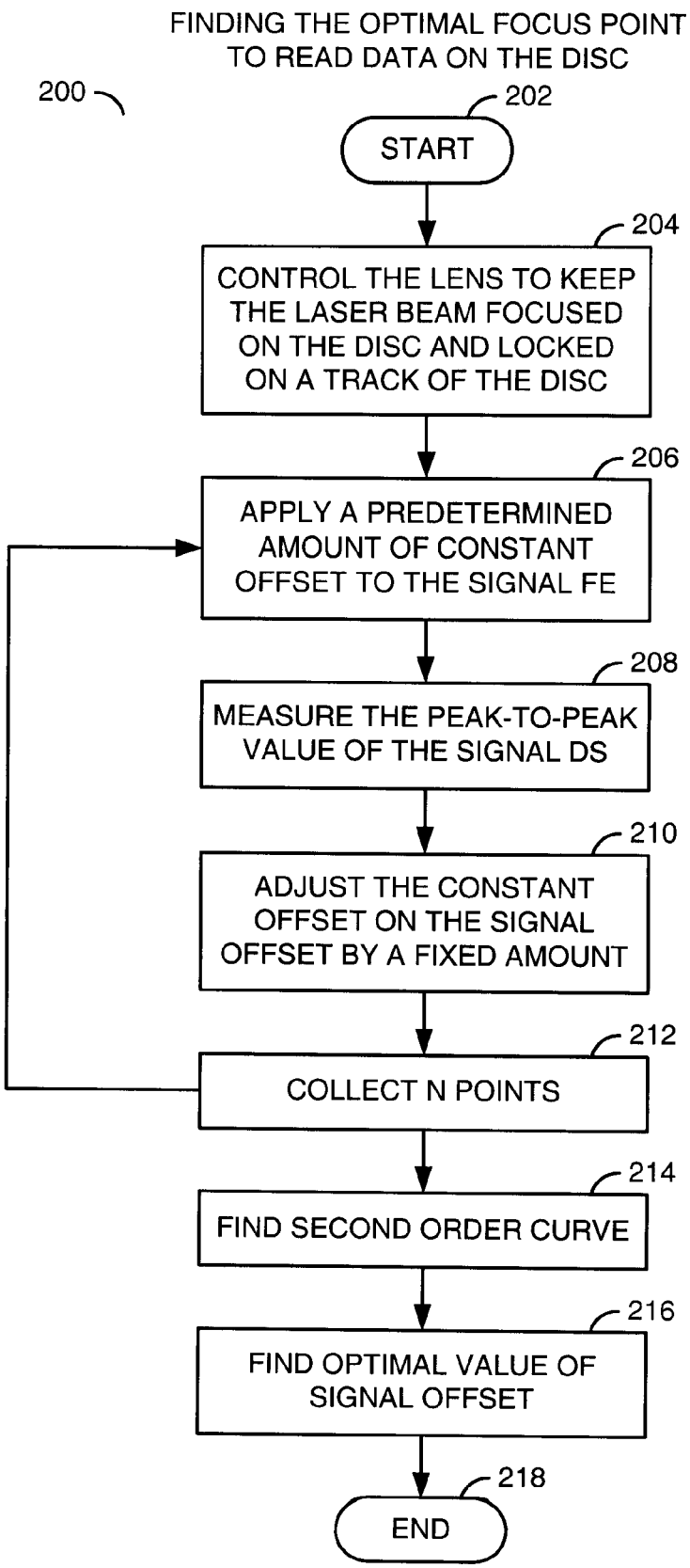
FIG. 8 is a flow diagram for finding the optimal focus point to read data from an optical disc.

Referring to FIG. 8, a method 200 for optimizing the focus point to read data from an optical disc is shown. The method 200 generally comprises a state (or step) 202, state (or step) 204, a state (or step) 206, a state (or step) 208, a state (or step) 210, a state (or step) 212, a state (or step) 214, a state (or step) 216 and a state (or step) 218. The state 202 may be a start state. The state 218 may be an end state.

The state 204 may control the lens 126 to keep the laser beam 124 focused on the surface of the disc 104. When the lens 126 is controlled by the focus controller 114 so that the laser beam 124 is focused on the disc 104, the laser beam 124 may be controlled to lock to any one of a particular tracks of data 105a-105n on the disc 104. The state 206 may apply a predetermined amount of constant offset in the signal OFFSET. The predetermined amount of offset in the signal OFFSET may be added to the signal FE to generate the signal FE_AFTER_OFFSET. The state 208 may measure the peak-to-peak value of signal DS as the signal OFFSET is added to the signal FE to generate the signal FE_AFTER_OFFSET.

The state 210 may gradually adjust (by increasing or decreasing) the signal OFFSET by a fixed predetermined amount. The state 212 may repeat states 206, 208, and 210 a number of times (e.g., N). The step 208 may collect Xi and Yi values (where i=1, 2, . . . , N). The Yi value may correspond to the measured peak-to-peak values of the signal DS when the states 206 and 208 are repeated N-times. The Xi value may correspond to the adjusted values of the signal OFFSET when the state 210 is repeated N times.

The state 214 may find a second order curve from the N points (Xi, Yi) (where i=1, 2, . . . , N) collected in the state 212. The second-order curve may be defined by $Y=A*X^2+B*X+C$ (with i=1, 2, . . . , N) which goes through N points (Xi, Yi) so that the sum of $(Y-Yi)^2$ is minimal.

The state 216 may find the optimal value of the signal OFFSET from the second order curve $Y=A*X^2+B*X+C$. The optimal value of the signal OFFSET may be found when the signal OFFSET allows the peak-to-peak value Y of the signal DS to become maximal. The optimal value of the signal OFFSET may be applied to signal FE via the adder 112 to obtain the best (or increased) focus point for the laser beam 124 to read data on the disc 104.

Figure 9:
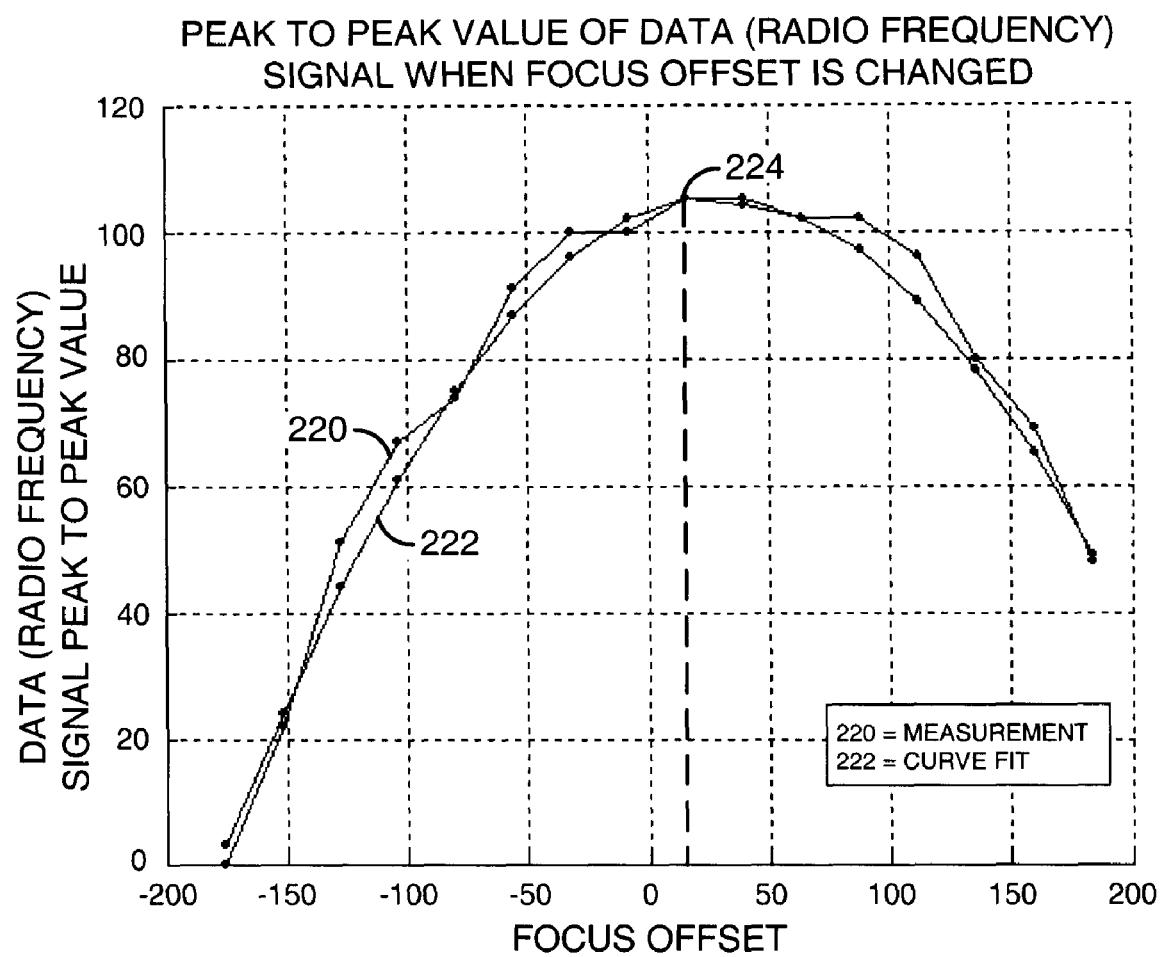
FIG. 9 is a diagram illustrating the peak-to-peak value of the signal DS as the focus offset is changed.

FIG. 9 illustrates the peak-to-peak value of the signal DS as the signal OFFSET is changed. FIG. 9 illustrates a measurement plot 220 and a curved plot 222. The optimal value of the signal OFFSET is shown as a point 224. FIG. 9 illustrates that the point 224 may be at the second value which is slightly off of the first value (or zero). The point 224 may correspond to the optimal focus point of the laser beam 124 on the disc 104.

Figure 10:
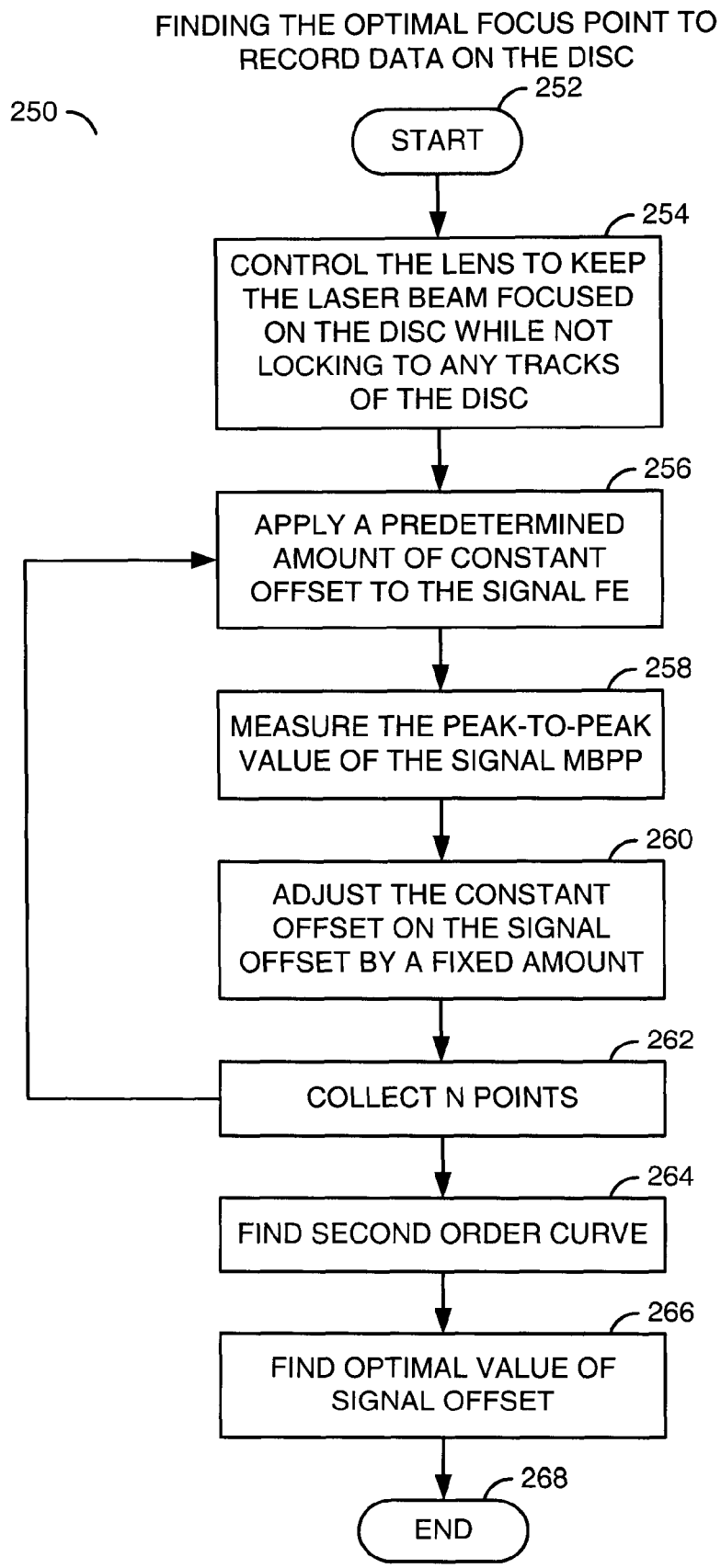
FIG. 10 is a flow diagram for finding the optimal focus point to record data on an optical disc.

Referring to FIG. 10, a method 250 for optimizing the focus point to record data on an optical disc is shown. The method 250 generally comprises a state (or step) 252, a state (or step) 254, a state (or step) 256, a state (or step) 258, a state (or step) 260, a state (or step) 262, a state (or step) 264, a state (or step) 266, and a state (or step) 268. The state 252 may be a start state.

The state 254 may control the lens 126 to keep the laser beam 124 focused on the surface of the disc 104. When the lens 126 is controlled so that the laser beam 124 is focused on the disc 104, the laser beam 124 may not be controlled to lock on a particular one of a number of physical tracks 105a-105n of the disc 104. The state 256 may apply a predetermined amount of constant offset in the signal OFFSET. The predetermined amount of offset in the signal OFFSET may be added to the signal FE to generate the signal FE_AFTER_OFFSET.

The state 258 may measure the average peak-to-peak value of the signal MBPP based on revolutions (e.g., R) of the spinning disc 104. The number of revolutions R used by the method 250 to measure the average peak-to-peak value of the signal MBPP may be varied to meet the design criteria of a particular implementation.

The state 260 may gradually adjust (by increasing or decreasing) the signal OFFSET by a fixed predetermined amount. The state 262 may repeat states 256, 258 and 260 a number of times (e.g., N). The step 258 may collect Xi and Yi values (where i=1, 2, . . . , N). The Yi value may correspond to the measured peak-to-peak values of the signal MBPP when the states 256-258 are repeated N-times. The Xi value may correspond to the adjusted values of the signal OFFSET when the state 260 is repeated N-times.

The state 264 may find a second order curve from the N points (Xi, Yi) (where i=1, 2, . . . , N) collected in the state 260. The second-order curve may be defined by $Y=A*X^2+B*X+C$ (with i=1, 2, . . . , N) which goes through N points (Xi, Yi) so that the sum of $(Y-Yi)^2$ is minimal.

The state 266 may find the optimal value of the signal OFFSET from the second order curve $Y=A*X^2+B*X+C$. The optimal value of the signal OFFSET may be found when the signal OFFSET allows the peak-to-peak value Y of the signal MBPP to become maximal. The optimal value of the signal OFFSET may be applied to the signal FE via the adder 112 to obtain the best (or increased) focus point for the laser beam 124 to record data on the disc 104.

Figure 11:
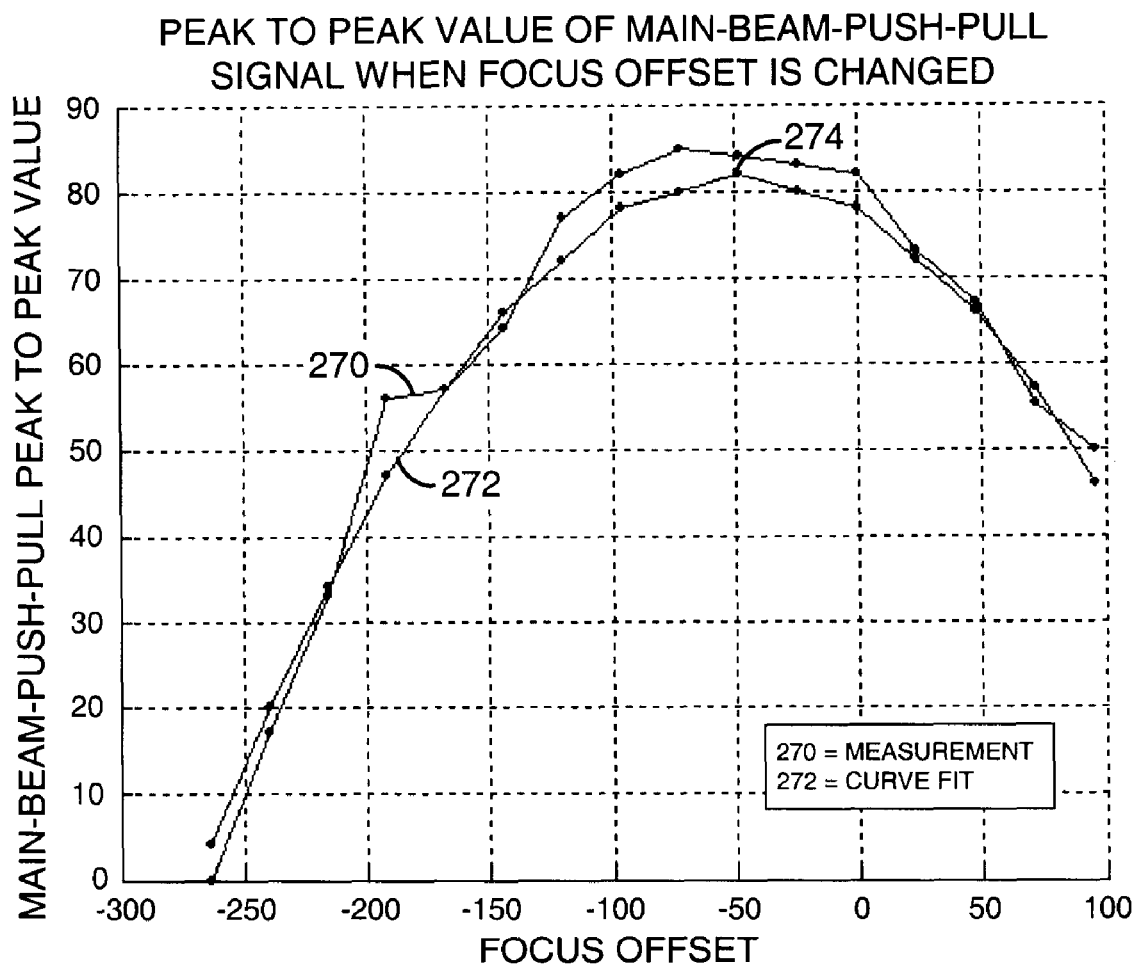
FIG. 11 is a diagram illustrating the peak-to-peak value of the main beam peak-to-peak signal.

FIG. 11 illustrates the peak-to-peak value of the signal MBPP as the signal OFFSET is changed. FIG. 11 illustrates a measurement plot 270 and a curved plot 272. The optimal value of the signal OFFSET is shown as a point 274. FIG. 11 illustrates that the point 274 may be at a second value which is slightly off of the first value (or zero). The point 274 may correspond to the optimal focus point of the laser beam 124 to record data on the disc 104.

The present invention may (i) optimize the focus point of the laser beam 124 on the optical disc 104 based on whether (a) data is being read from the disc 104 or (b) data is being written to the disc 104, (ii) provide a high degree of reliability by using a curved-fit technique to find the optimal value of a focus offset, (iii) be easily implemented within hardware and/or firmware or completely with firmware, and (iv) ensure a high degree of quality in optimizing the focus point of the laser beam 124 to either read or record data on the optical disc 104.

The function performed by the flow diagram of FIGS. 8 and 10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. The present invention may be particularly useful in an optical disc system (e.g., CD type, DVD type, etc.). The present invention may be useful in newly developing formats such as Blue-ray and HD-DVD systems.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to generate status signals and an error signal in response to accessing a storage medium, wherein said error signal provides a first value based on an accuracy of accessing said storage medium; and
a second circuit configured to offset said first value of said error signal to a second value to increase the accuracy of accessing said storage medium, wherein (i) said status signals comprise one or more of a data signal and a differential signal, (ii) in a first mode, an offset signal is generated in response to said data signal, and (iii) in a second mode the offset signal is generated in response to said differential signal.

2. The apparatus according to claim 1, wherein said second circuit is configured to offset said first value of said error signal to said second value to increase the quality of a reading process when reading data from said storage medium.

3. The apparatus according to claim 1, wherein said second circuit is configured to offset said first value of said error signal to said second value to increase the quality of a writing process when writing data to said storage medium.

4. The apparatus according to claim 1, wherein said data signal is generated when reading data from an optical disc and said differential signal comprises a beam push-pull signal generated when writing or rewriting data to said optical disc.

5. The apparatus according to claim 1, wherein said data signal comprises a radio frequency signal.

6. The apparatus according to claim 1, wherein said first circuit comprises:
a data circuit configured to generate said status signals in response to a laser beam focused on a disc; and
an error circuit configured to generate said error signal, wherein said error signal provides said first value based on a focus point of said laser beam.

7. The apparatus according to claim 6, further comprising:
a sensor configured to generate a plurality of sensory signals in response to said laser beam, wherein said data circuit generates said status signals in response to said plurality of sensory signals.

8. The apparatus according to claim 6, further comprising:
a focus controller configured to control a lens in relation to said laser beam and allow said laser beam to focus on said disc.

9. An apparatus comprising:
means for generating a plurality of status signals and an error signal, wherein said error signal provides a first value based on an accuracy of an access of a storage medium; and
means for offsetting said first value of said error signal to a second value to increase the accuracy of accessing said storage medium, wherein (i) said status signals comprise one or more of a data signal and a differential signal, (ii) in a first mode, an offset signal is generated in response to said data signal, and (iii) in a second mode the offset signal is generated in response to said differential signal.

10. A method for increasing accuracy of accesses to a storage medium, comprising the steps of:
(A) generating status signals in response to accessing said storage medium;
(B) generating an error signal which provides a first value based on an accuracy of an access of said storage medium; and
(C) offsetting said first value of said error signal with an offset signal to a second value to increase the accuracy of accessing said storage medium, wherein (i) said status signals comprise one or more of a data signal and a differential signal, (ii) in a first mode, the offset signal is generated in response to said data signal, and (iii) in a second mode the offset signal is generated in response to said differential signal.

11. The method according to claim 10, wherein step (C) further comprises the step of:
offsetting said first value of said error signal said second value to increase the quality of a reading process when reading data from said storage medium; and
offsetting said first value of said error signal to said second value to increase the quality of a writing process when writing or rewriting data to said storage medium.

12. The method according to claim 10, wherein said storage medium comprises a disc and said method further comprises the steps of:
controlling a lens in relation to a laser beam to allow said laser beam to focus on said disc;
generating said status signals in response to said laser beam focused on said disc; and
generating said error signal such that said first value is based on a focus point of said laser beam.

13. The method according to claim 12, further comprising the step of:

controlling said lens in relation to said laser beam to allow said laser beam to focus on said disc while at the same time controlling said laser beam to lock on a physical track on said disc.

14. The method according to claim 12, wherein step (C) further comprises the steps of:

(D) applying a predetermined amount of constant offset to said error signal with said offset signal;

(E) measuring a peak-to-peak value of said data signal in response to applying said predetermined amount of constant offset; and (F) adjusting said offset signal by a fixed predetermined amount.

15. The method of claim 14, further comprising the steps of:

repeating steps (D), (E) and (F) a number of times to collect a number of (i) peak-to-peak values of said data signal and (ii) adjusted values of said offset signal.

16. The method according to claim 15, further comprising the steps of:

finding a second-order curve using (i) said number of peak-to-peak values of one of said data signal and (ii) said adjusted values of the offset signal; and finding said second value from said second order curve.

17. The method according to claim 16, further comprising the step of:

controlling said lens in relation to said laser beam to allow said laser beam to focus on said disc without controlling said laser beam to lock on a physical track on said disc.

18. The method according to claim 17, wherein step (C) further comprises the steps of:

(G) applying a predetermined amount of constant offset to said error signal with said offset signal;

(H) measuring a peak-to-peak value of said differential signal in revolutions in response to applying said predetermined amount of constant offset; and (I) adjusting said offset signal by a fixed predetermined amount.

19. The method of claim 18, further comprising the steps of:

repeating steps (G), (H) and (I) a number of times to collect a number of (i) peak-to-peak values of said differential signal and (ii) adjusted values of said offset signal.

20. The method according to claim 19, further comprising the steps of:

finding a second-order curve using (i) said number of peak-to-peak values of said differential signal and (ii) said adjusted values of the offset signal; and finding said second value from said second order curve.

* * * * *